United States Patent [19]

Uda et al.

[11] Patent Number: 5,739,890

[45] Date of Patent: Apr. 14, 1998

[54] LIQUID CRYSTAL DISPLAY DEVICE AND A METHOD OF FABRICATING SAME

[75] Inventors: Mitsuru Uda; Masami Shinohara; Mamoru Nishida, all of Shiga-ken, Japan

[73] Assignee: International Business Machines Corporation, Armonk, N.Y.

[21] Appl. No.: 597,206

[22] Filed: Feb. 6, 1996

[30] Foreign Application Priority Data

Feb. 6, 1995 [JP] Japan ................... 7-017692

[51] Int. Cl.$^6$ ........................... G02F 1/1339
[52] U.S. Cl. ................. 349/156; 349/110; 349/162; 349/155; 349/187; 349/138
[58] Field of Search ................. 349/155, 156, 349/29, 30, 110, 111, 113, 138, 114, 162, 44, 187; 430/5, 6, 20; 445/24

[56] References Cited

U.S. PATENT DOCUMENTS 4,678,542  7/1987  Boer et al. ............... 156/659.1
4,999,619  3/1991  Te Velde .................. 349/155

Primary Examiner—William L. Sikes
Assistant Examiner—Tai V. Duong
Attorney, Agent, or Firm—Ronald L. Drumheller

[57] ABSTRACT

This invention relates to a reflection liquid crystal display device using a reflection liquid crystal light bulb and a method for fabricating such liquid crystal display devices, and an object thereof is to provide a liquid crystal display device and its manufacture wherein the numerical aperture of the subpixel is increased to improve the display brightness. The present method comprises the steps of forming an optical absorbing layer 26 on a semiconductor substrate 1; forming a plurality of light reflecting films 32 on the optical absorbing layer 26 via an insulating film 28; forming an insulating film 36 all over the surface; coating positive photoresist all over the insulating film 36 to form a resist layer 64; exposing and developing the resist layer 64 from above to form a mask in such a way that the resist layer 64 remains only on the regions between the plurality of light reflecting films 32 in a self-aligned manner; and using the mask to etch the insulating film 36 to form pillar-shape spacers 34 on the regions between the plurality of light reflecting films 32.

6 Claims, 6 Drawing Sheets

LIQUID CRYSTAL DISPLAY DEVICE AND A METHOD OF FABRICATING SAME

BACKGROUND OF THE INVENTION

1. Field of the Invention

The present invention relates to a liquid crystal display device and its fabricating method, and in particular, to a projection liquid crystal display device using a reflection liquid crystal light bulb and a method for manufacturing such liquid crystal display devices.

2. Related Art

In recent years, attention has been paid to projection liquid crystal display devices due to the possibility of their replacing CRTs as very high definition displays. Projection liquid crystal display devices have already been used in and OHP displays.

A projection optical system in a projection liquid crystal display device comprises a light source, a light bulb, a screen, an optical filter, and a projection lens. A liquid crystal display panel is used for the light bulb, and light bulbs include transmission liquid crystal light bulbs that transmit light from the light source to project an image on the screen and reflection liquid crystal light bulbs that reflect light from the light source to project an image on the screen.

Active matrix liquid crystal display devices including the projection type generally comprise an array substrate on which a switching element and a display electrode connected to the switching element are formed, and an opposing substrate on which an opposing electrode is provided opposite to the array substrate at a predetermined interval (cell gap) therefrom, with liquid crystal sealed in the region between the array substrate and the opposing substrate.

To obtain specified electro-optical characteristics of a liquid crystal material, specified cell gaps must be provided uniformly all over the surface of the panel. Some methods thus provide uniform cell gaps by scattering a large number of glass or plastic balls of few microns in diameter as spacers. These methods using spacers, however, have disadvantages that it is very difficult to provide balls of a uniform diameter and to uniformly distribute spacer balls on the panel and that the spacers located on pixels cause a loss of light.

A method of forming pillars of insulating films in cell gaps and using them as spacers has been proposed to replace the above method of distributing the spacers. This method employs a photolithographic process used commonly as a manufacturing process for semiconductor devices, and forms pillars of a silicon oxide film in cell gaps as spacers. This method has an advantage that the position, number, and height of the spacers can be freely controlled compared to conventional methods using spacer balls.

FIG. 10 is a schematic cross section of a conventional reflection liquid crystal light bulb using pillars of silicon oxide films as spacers.

A transistor 104 that is not shown in detail is formed on a silicon substrate 100. A silicon oxide film 102 about 2 μm in thickness is formed on both the silicon substrate 100 and the transistor 104, and an optical absorbing layer 106 is formed on the silicon oxide film 102. A silicon nitride film 108 with a thickness of 5,000 Å is formed on the optical absorbing layer 106, and an Al light reflecting film 112 with a thickness of 1,500 Å is formed thereon.

The light reflecting film 112 is connected to a source electrode (not shown) in the transistor 104 via a tungsten stud 110 buried in a through hole formed so as to penetrate both the silicon oxide film 102 and the silicon nitride film 108, and functions as a display electrode for driving liquid crystal. A single light reflecting film 112 constitutes a single subpixel. An Al layer is not formed in the region (the distance: about 1.7 μm) between the adjacent light reflecting films 112, and pillar-shape spacers 118 of a silicon oxide film about 5 μm in height is formed in the specified regions between the light reflecting films 112. In the cross section in FIG. 10, the pillar-shape spacer 118 is formed so as to rest on the light reflecting film 112 on both sides of it for a distance of about 1 μm. A glass protect substrate 116 acting as an opposing substrate is formed via the spacers 118. An opposing electrode 114 is formed all over the light reflecting film side of the glass protect substrate 116. Liquid crystal is sealed in cell gaps about 5 μm in thickness created by the spacers 118 to form a liquid crystal layer 120.

The transistor 104 is a field effect transistor (FET) in which a source electrode, a drain electrode connected to a data line, and a gate electrode connected to a scan line (these electrodes are not shown), and functions as a switching element that applies a voltage applied to the data line to the light reflecting film 112 acting as a display electrode, when the gate is turned on.

Display is executed by allowing light entering from the glass protect substrate 116 to travel through to the light reflecting film 112 and then to exit the glass protect substrate 116 by means of reflection, or preventing the light from transmission, by varying the direction of liquid crystal particles 122 according to a voltage applied between the light reflecting film 112 acting as a display electrode and the opposing electrode 114 when the transistor 104 is turned on, thereby changing the light transmission factor.

For such a projection liquid crystal display device that provides very high definition display on a large screen, methods for improving the display brightness are important. To improve the display brightness, for example, the numerical aperture of the subpixel may be increased. In the reflection liquid crystal light bulb shown in FIG. 10, however, the pillar-shape spacer 118 rests on the light reflecting film 112 on both sides of it, thereby reducing the light reflecting area of the light reflecting film 112 to reduce the numerical aperture of the subpixel.

FIGS. 11(a)–(b) are used to describe the reason why conventional spacers 118 are formed so as to rest on the light reflecting film 112. A silicon oxide film about 5 μm in thickness is deposited on the silicon nitride film 108 and the light reflecting films 112 formed thereon. Resist is coated all over the surface, which is then exposed and patterned to form as a mask a resist layer 132 in the positions of spacers to be formed in the boundaries between the light reflecting films 112 (FIG. 1a). The silicon oxide film 130 is etched using the resist layer 132 as a mask in order to obtain desired pillar-shape spacers 118 (FIG. 11(b)).

In this photoresist process, since the alignment accuracy of an exposure device used to pattern the resist layer 132 is insufficient, positioning for patterning must not be too rigid, and a somewhat large patterning mask must thus be used to expose the resist layer 132. This forces the width of the patterned resist layer to be larger than the distance between the light reflecting films 112, that is, about 1.7 μm. The width may be, for example, 4 μm. When the spacer 118 is formed using this patterned resist layer as a mask, it has a width of about 4 μm that is larger than the distance between the light reflecting films 112, and thus rests on the light reflecting film 112 on both sides of it for an area of about 5.3 μm². Consequently, the numerical aperture of the subpixel must be reduced by about 5%.

3

It is an object of this invention to provide a liquid crystal display device with a display brightness improved by increasing the numerical aperture of the subpixel and a method for manufacturing such liquid crystal display devices.

SUMMARY OF THE INVENTION

The above object is achieved by a liquid crystal display device having a plurality of light reflecting films that reflects incident light and also functions as a display electrode, an opposing electrode installed opposite o the reflecting films on the incidence side thereof, a liquid crystal layer sealed between the light reflecting films and the opposing electrode, pillar-shape spacers formed in the liquid crystal layer so as to maintain specified cell gaps, and an optical absorbing layer formed at least between the plurality of light reflecting films below them, wherein the spacers are formed on the regions between the light reflecting films and not directly on the light reflecting films.

The above object is also achieved by forming the optical absorbing layer by laminating Ti about 100 Å in thickness, Al about 1,000 Å in thickness, and TiN about 500 Å in thickness in this order.

The above object is also achieved by forming an optical absorbing layer on a semiconductor substrate; forming a plurality of light reflecting films on the optical absorbing layer via a first insulating film; forming a second insulating film all over the surface; coating positive photoresist all over the second insulating film to form a resist layer; exposing and developing the resist layer from above to form a mask in such a way that the resist layer remains only on the regions between the plurality of light reflecting films in a self-aligned manner; and using the mask to etch the second insulating film to form pillar-shape spacers on the regions between the plurality of light reflecting films.

The above object is also achieved by forming a plurality of switching elements on a semiconductor substrate; forming a first insulating film all over the surface; forming an optical absorbing layer on the first insulating film; forming a second insulating film all over the surface; forming a plurality of conductive studs insulated electrically from the optical absorbing layer and connected electrically to the plurality of switching elements, respectively; forming on the second insulating film a plurality of conductive light reflecting films connected electrically to the studs and corresponding to the plurality of switching elements, respectively; forming a third insulating film all over the surface; coating positive photoresist all over the third insulating film to form a resist layer; exposing and developing the resist layer from above to form a mask in such a way that the resist layer remains only on the regions between the plurality of light reflecting films in a self-aligned manner; and using the mask to etch the third insulating film to form pillar-shape spacers on the regions between the plurality of light reflecting films; sticking this substrate to an opposing substrate on which an opposing electrode supported by the spacers is formed; and sealing liquid crystal in the cell gaps formed by the spacers.

The above objects is also achieved by the above manufacture of a liquid crystal display device wherein when the resist layer is exposed, the positions in which the spacers are to be formed are masked before exposure.

Since this invention coats positive photoresist all over the surface of an insulating film to form a resist layer, and exposes and develops the resist layer from above to allow the layer to remain as a mask only on the regions between a plurality of light reflecting films, the insulating film can be etched using this mask in order to form pillar-shape spacers only on the regions between the plurality of light reflecting films.

DESCRIPTION OF THE PREFERRED EMBODIMENTS

A liquid crystal display device according to an embodiment of this invention is described with reference to FIGS. 1 to 3.

Figure 1:
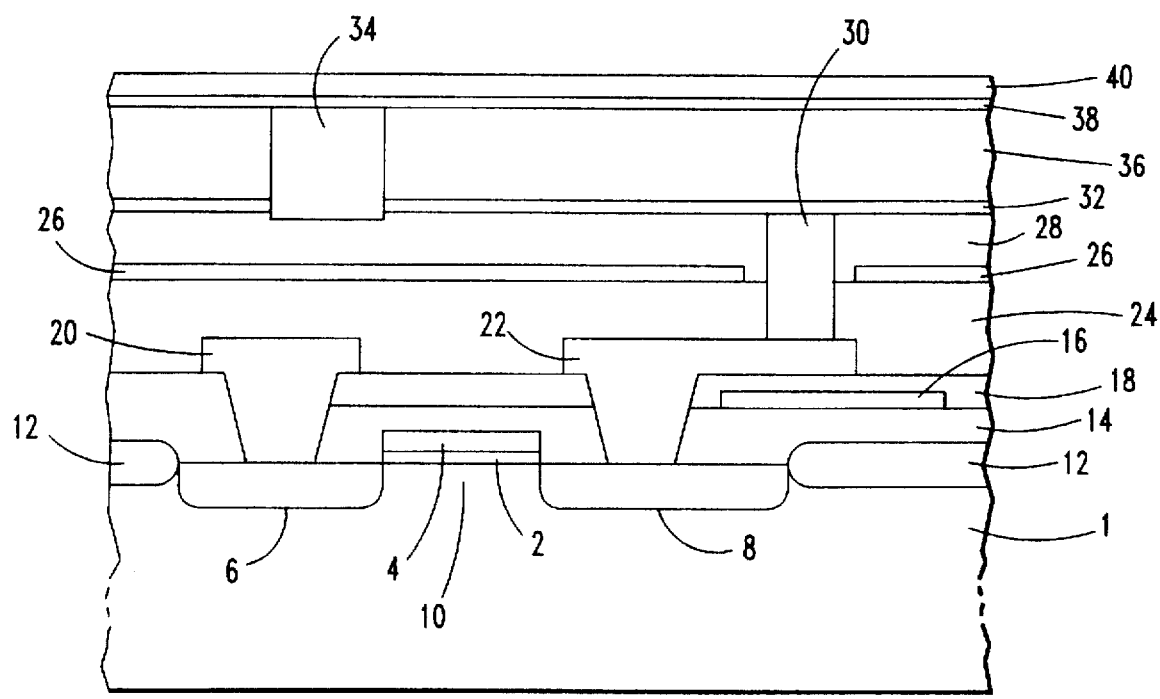
FIG. 1 shows the configuration of a liquid crystal display device according to an embodiment of this invention.

FIG. 1 is a partial cross section of a reflection liquid crystal light bulb for the liquid crystal display device according to this embodiment. A field effect transistor (FET) is formed in each of a plurality of regions defined by field oxide films 12 on a semiconductor substrate that is, for example, a silicon substrate 1. The FET has the following configuration. A gate insulating film of, for example, $SiO_2$ 150 to 500 Å in thickness is formed on the silicon substrate 1, and a polysilicon gate electrode 4 with a thickness of for example, 0.44 µm is formed thereon. A drain region 6 and a source region 8 are formed in those regions of the silicon substrate 1 which are located on both sides of the gate electrode 4. A channel region 10 is formed in the silicon substrate 1 below the gate electrode 4.

A storage capacity line 16 is then formed via a silicon oxide film 14. A data line 20 and a source line 22 both comprising aluminum (Al) and having a thickens of 0.7 µm are formed on the silicon oxide films 14 18 acting as inter-layer insulating films a data line 20 is connected to the drain region 6 of the FET, and the source electrode 22 is connected to the source region 8.

An optical absorbing layer 26 is then formed via a silicon oxide film 24 acting as an inter-layer insulating film. The optical absorbing layer 26 preferably has a thickness of 160 nm and comprises a titanium (Ti) layer 100 Å in thickness, an Al layer 1,000 Å in thickness, and a titanium nitride (TiN) layer 500 Å in thickness laminated in this order. Laminating these materials so as to provide the above thickness can prevent light entering the optical absorbing layer 26 (the wavelength: 380 to 700 Å) from reflecting (to obtain a reflection factor of 25%) and from being transmitted to the FET (to obtain a transmission factor of 0%). The optical absorbing layer 26 serves to improve the contrast of images and to prevent leakage currents in the FET.

A silicon nitride film 28 with a thickness of 400 to 500 nm is formed on the optical absorbing layer 26, and an Al light reflecting film 32 with a thickness of 150 nm is formed thereon. The source electrode 22 of the FET and the light reflecting film 32 are connected together via, for example, a tungsten (W) stud 30 formed by a CVD method in a through hole formed so as to penetrate both the silicon oxide film 24 and the silicon nitride film 28. The optical absorbing layer 26 is opened around the tungsten stud 30 so as not to be connected electrically thereto.

The light reflecting film 32 is formed for each of a plurality of FETs, and a single light reflecting film 32 constitutes a single subpixel. The light reflecting films 32 are spaced apart at a specified interval of about 1.5 to 1.7 μm, and pillar-shape spacers 34 of, for example, $SiO_2$ with a thickness of 2 to 5 μm that is determined according to desired cell gaps are formed as shown in the figure.

The spacer 34, is located between the light reflecting films 32 in such a way that it does not rest on the films 32 on the both sides of it, and has a width almost equal to the distance between the light reflecting films 32. This serves to prevent the numerical aperture of the subpixel from decreasing due to the pillar-shape spacer 34. A plurality of spacers 34 are provided throughout the substrate at a specified interval to retain predetermined cell gaps.

A glass protect substrate 40 on which an opposing electrode 38 that is a transparent electrode of indium titanium oxide (ITO) is formed is stuck onto the pillar-shape spacers 34. A liquid crystal layer 36 in which a liquid crystal material is sealed is formed in the region (the cell gap) between the light reflecting film 32 and the opposing electrode 38. Liquid crystal particles are oriented by an orienting film (not shown).

Figure 2:
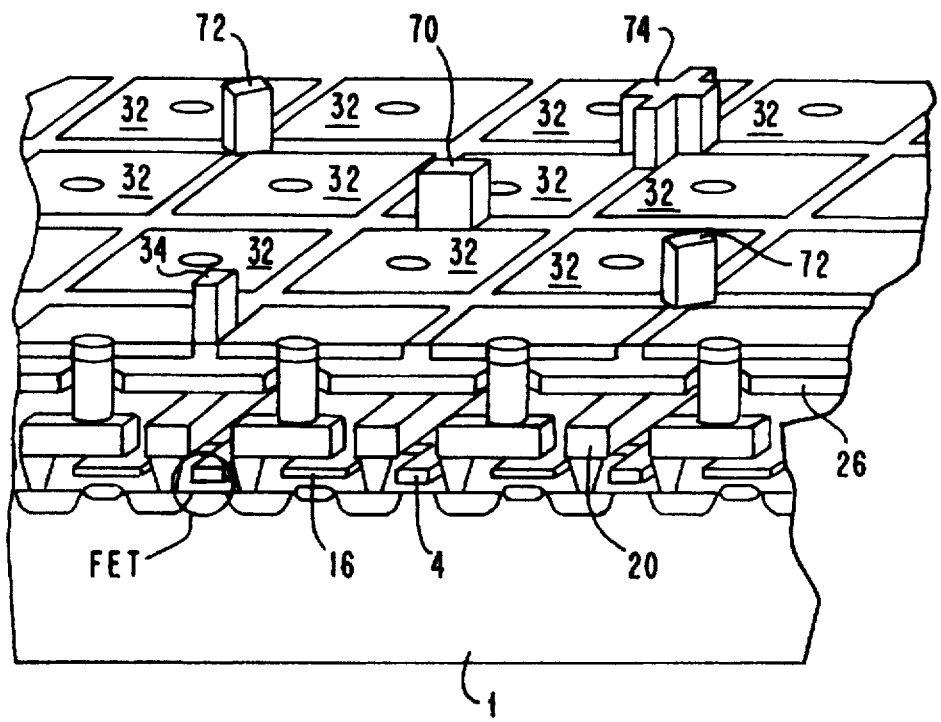
FIG. 2 shows the configuration of the liquid crystal display device according to the embodiment of this invention.

FIG. 2 is a perspective view schematically showing a reflection liquid crystal light bulb according to this embodiment. As shown in this figure, the pillar-shape spacers 34 are formed in the regions between the light reflecting films 32 at a specified interval. In this embodiment the light reflecting film 32 constituting a subpixel is formed so as to be a square with a side of 17 μm. The subpixels are arranged in a matrix of 1,280 rows and 1,600 columns to form a light bulb.

In the reflection liquid crystal light bulb according to this embodiment, the light reflecting film 32 reflects light entering from the glass protect substrate 40 and also functions as a display electrode for applying a voltage to the liquid crystal layer 36. The FET functions as a switching element for applying a signal voltage supplied to the data line 20, to the light reflecting film 32 acting as the display electrode, when the gate 4 is turned on. Display is executed by allowing light entering from the glass protect substrate 40 to travel through to the light reflecting film 32 and then to exit the glass protect substrate 40 by means of reflection, or preventing the light from transmission, by varying the direction of liquid crystal particles (not shown) according to a voltage applied between the light reflecting film 32 acting as a display electrode and the opposing electrode 38 when the FET is turned on, thereby changing the light transmission factor.

Figure 3:
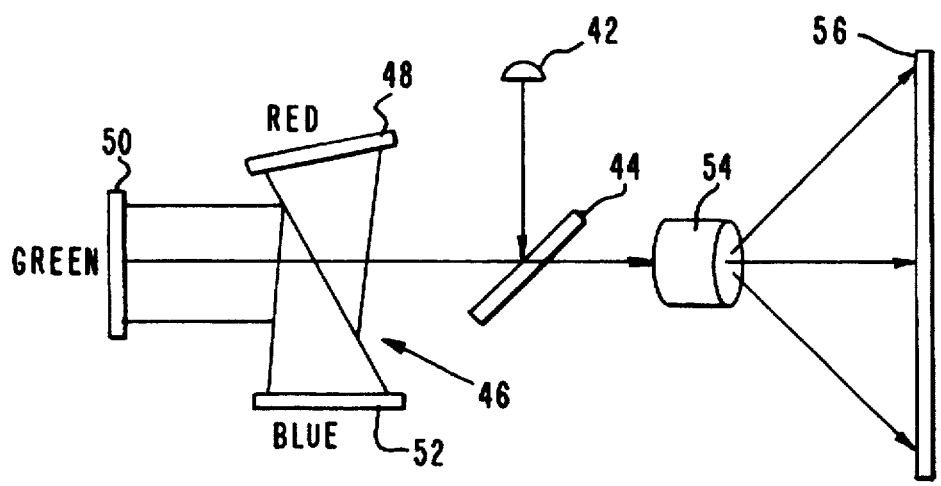
FIG. 3 shows the configuration of the liquid crystal display device according to the embodiment of ibis invention.

FIG. 3 is a schematic view of a projection liquid crystal display device using the reflection liquid crystal light bulb according to this embodiment. After originating from a light source 42 and then being linearly polarized, light is reflected by a polarized light beam splitter 44 and enters a color separation prism 46, where the light is split into three primary colors, that is, red (R), green (G), and blue (B), which then enter reflection liquid crystal light bulbs 48, 50, 52, respectively. The light has its brightness modulated by each reflection liquid crystal light bulb according to each subpixel, and is then reflected and again enters the color separation prism 46. The light is then linearly polarized perpendicularly to the original polarization, and enters the polarized beam splitter 44. The light reflected by the reflection liquid crystal light bulbs 48, 50, 52 passes through the polarized beam splitter 44 and enters a projection lens 54. Thereafter, the light is enlarged and projected on a screen 56.

A method of fabricating a liquid crystal display device according to an embodiment of this invention is described with reference to FIGS. 4 to 8.

The method of fabricating a liquid crystal display device according to this invention is characterized by a process for forming the pillar-shape spacer 34, so the steps preceding this process is described only briefly. A field oxide film 12 is first formed on a silicon substrate 1 to define a plurality of element formation regions for a FET. A silicon oxide film is formed in the element formation regions of the silicon substrate 1, and a polysilicon film is allowed to grow thereon by a CVD method. Patterning is then carried out to form a gate insulating film 2 and a gate electrode 4.

Impurities are added and diffused by injecting ions to form a drain region 6 and a source region 8. The CVD method is used to form a silicon oxide film 14 acting as an inter-layer insulating film, a storage capacity line 16 is formed thereon, and a silicon oxide film 18 is then deposited as an inter-layer insulating film. After a contact hole is opened, a data line 20 and a source electrode 22 are formed.

A silicon oxide film 24 is deposited all over the surface, and an optical absorbing layer 26 with a thickness of about 160 nm is formed thereon by sequentially laminating a titanium (Ti) layer about 100 Å in thickness, an Al layer about 1,000 Å, and a titanium nitride (TiN) layer about 500 Å. Through holes are formed in specified regions of the optical absorbing layer 26 so as to have a size enough to allow studs 30 formed later to penetrate the holes without contact. Next, a silicon nitride film 28 with a thickness of, for example, 400 to 500 nm is formed all over the surface.

Contact holes are formed in the opened regions of the optical absorbing layer 26 so as to penetrate both the silicon oxide film 24 and the silicon nitride film 28, and the tungsten (W) studs 30 are formed using the CVD method. Next, for example, Al is deposited all over the surface, which is then patterned to form square light reflecting films 32 each with a thickness of about 150 nm and a width of about 17 μm which are connected to the respective studs 30 and arranged, for example, in a matrix of 1,280 rows and 1,600 columns. In this embodiment, the distance between the light reflecting films 32 is 1.7 μm (FIG. 4).

Figure 4:
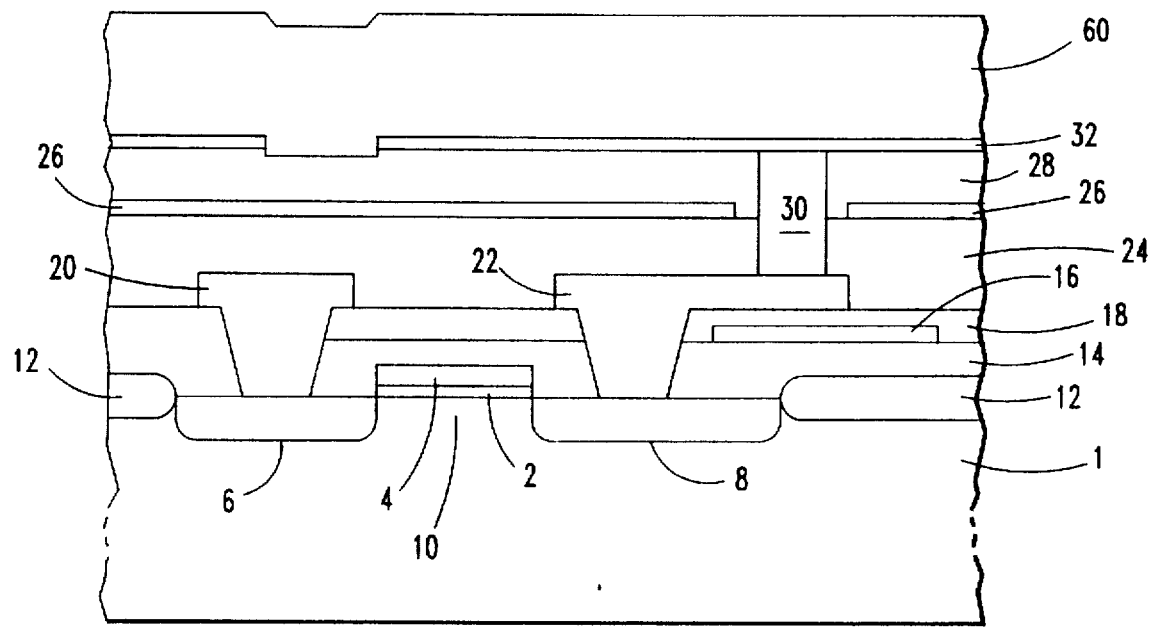
FIG. 4 shows a method of fabricating a liquid crystal display device according to an embodiment of this invention.
Figure 5:
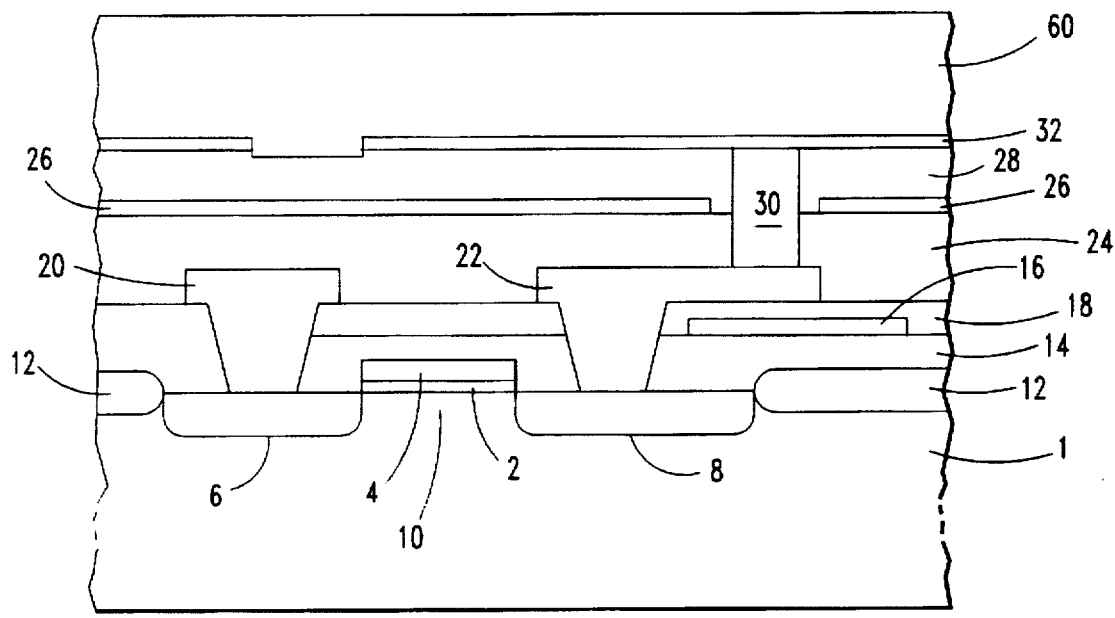
FIG. 5 shows the method of fabricating a liquid crystal display device according to the embodiment of this invention.

Next, a plasma CVD method is used to deposit a silicon oxide film 60 to a thickness of 2 to 5 μm so as to obtain desired cell gaps (FIG. 4). A chemical mechanical polishing (CMP) method is then used to polish the upper surface of the silicon oxide film 60 by, for example, about 0.5 μm to flatten it.

Figure 6:
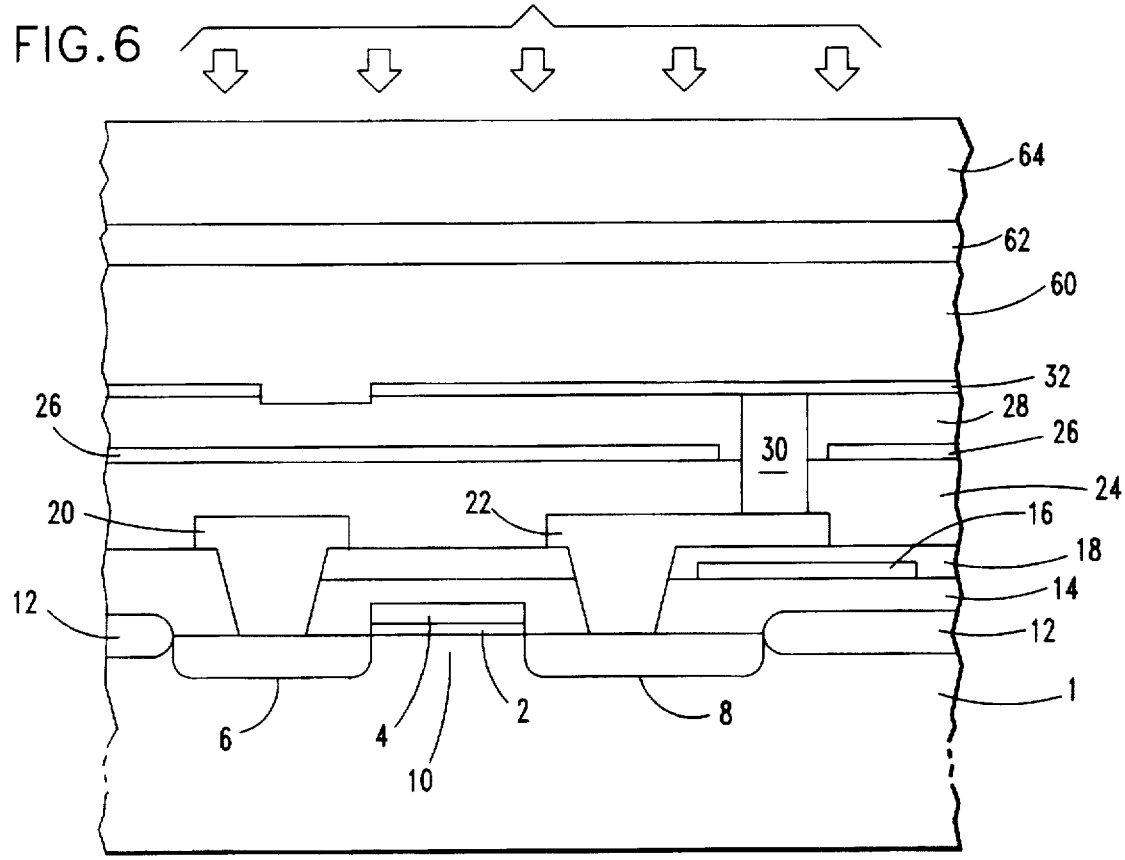
FIG. 6 shows the method of fabricating a liquid crystal display device according to the embodiment of this invention.
Figure 7:
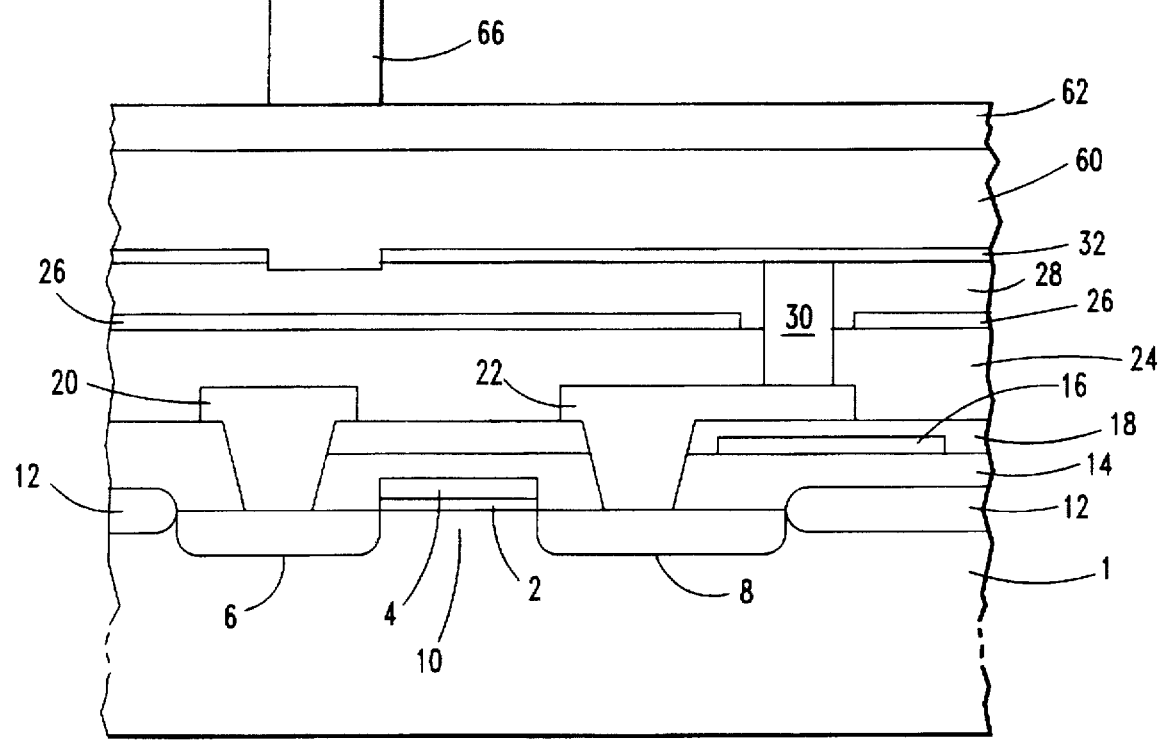
FIG. 7 shows the method of fabricating a liquid crystal display device according to the embodiment of this invention.

Next, after a silicon oxide film 62 is again deposited to a thickness of, for example, 0.5 μm, positive photoresist is coated thereon to a thickness of about 3.7 μm to form a photoresist film 64. Thereafter, the overall surface of the photoresist film 64 is exposed (FIG. 6).

If an underexposure equal to 60% of the exposure in which the size of an image on a glass mask is the same as that of a resist image (the 1:1 exposure; EOP) and an exposure wavelength of 320 to 450 Åm are used during the exposure, there will be a marked difference in the contrast within the substrate, that is, a significant difference between the exposure for the portion of the photoresist film 64 above the light reflecting film 32 and the exposure for the portion of the photoresist film 64 above the region between the light reflecting films 32 due to the difference between the reflecting factor of the light reflecting film 32 (80 to 90%) and the reflecting factor of the optical absorbing layer 26 (10 to 20%) located below the light reflecting film 32. This difference in the exposure causes the photoresist film 64 above the light reflecting film 32 to be exposed and the photoresist film 64 between the light reflecting films 32, excluding outermost surface, to be prevented from exposure, resulting in an self-aligned exposure.

Figure 9:
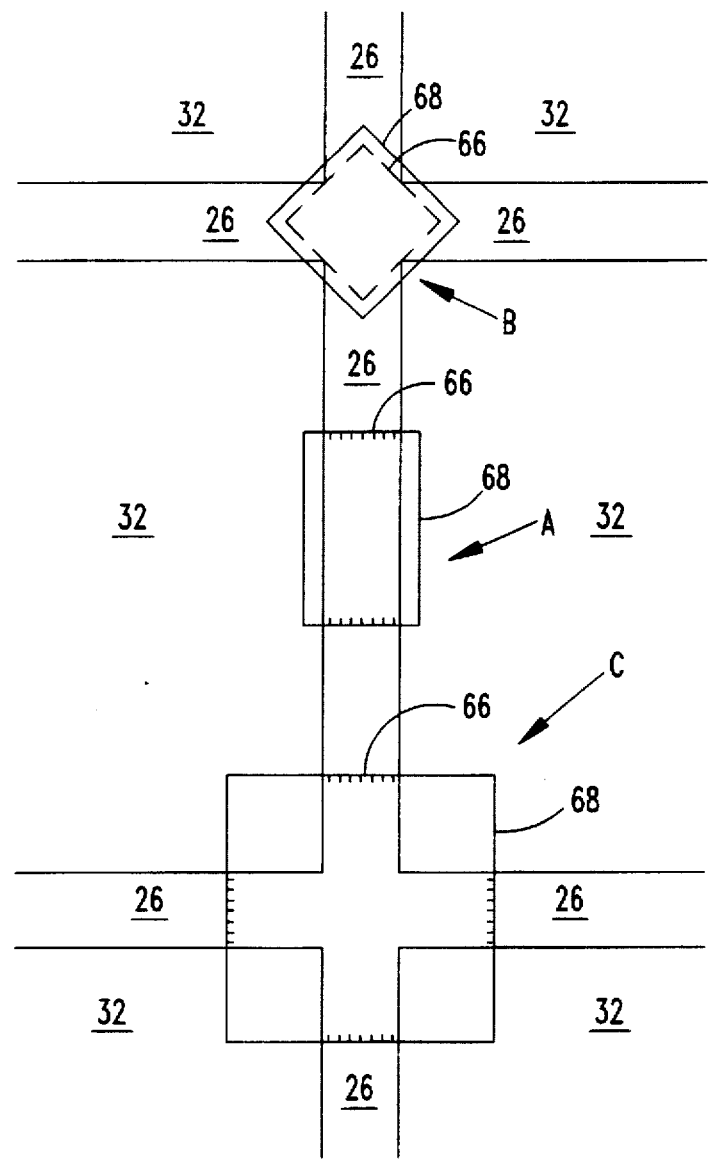
FIG. 9 shows a method of fabricating a liquid crystal display device according to another embodiment of this invention.
Figure 10:
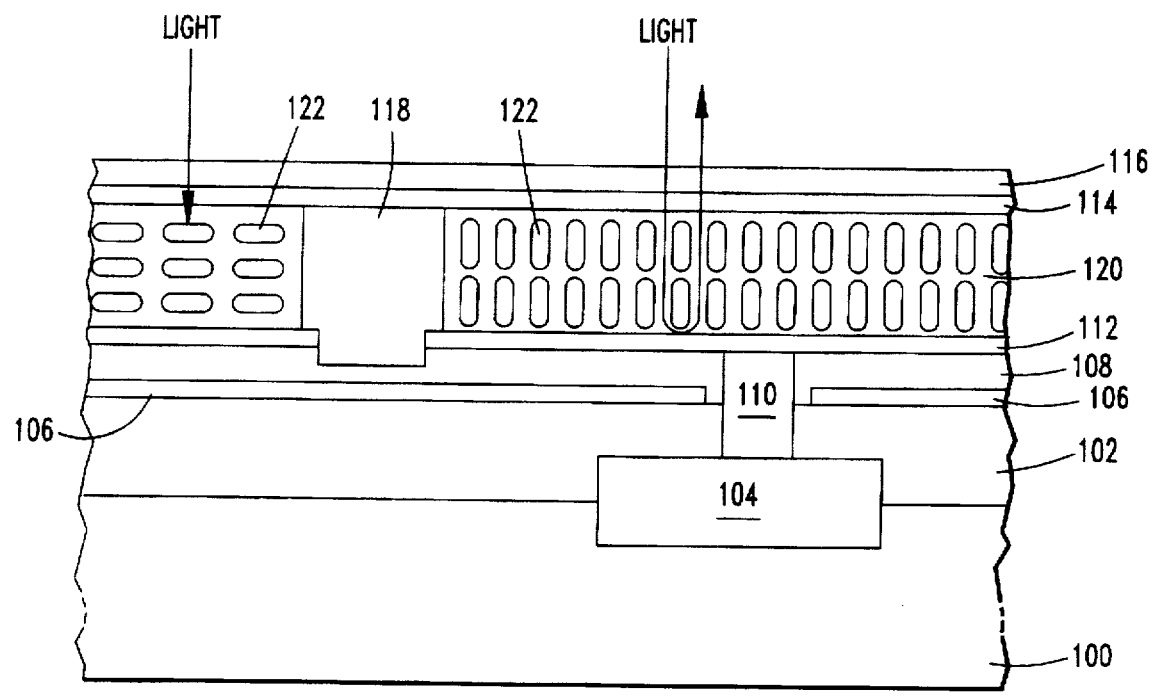
FIG. 10 shows the configuration of a conventional liquid crystal display device.
Figure 11A:
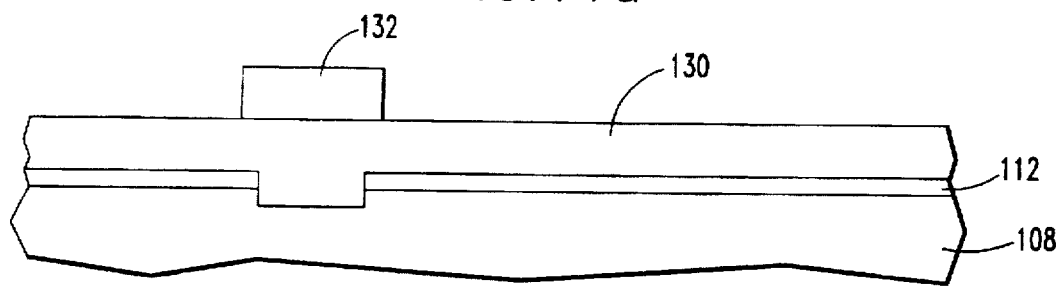
FIG. 11(a)–(b) show a conventional method of fabricating a liquid crystal display device.
Figure 11B:
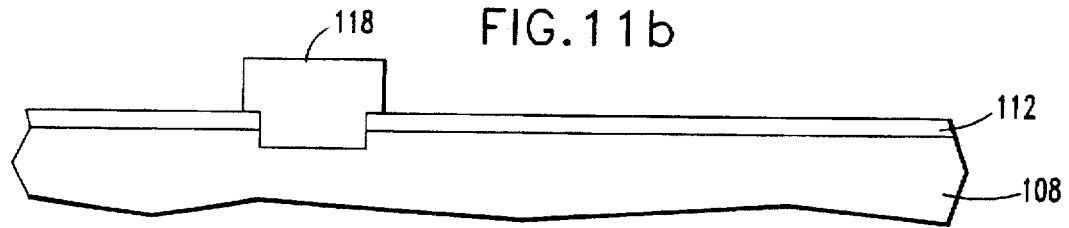

Next, a resist patterning mask 68 shown at A in FIG. 9 is used to re-expose the photoresist film 64 so as to obtain about the 1:1 exposure. FIG. 9 is a plan of the substrate 1 as viewed from the light reflecting film 32. After the re-exposure, development is executed to pattern the photoresist film 64 above the region between the light reflecting films 32 in the direction of the length of the region, thereby forming a mask 66 for forming spacers 34 of a specified length in the specified regions between the light reflecting films 32. The width of the formed mask 66 is almost restricted to 1.7 μm equal to the distance between the light reflecting films 32.

Figure 8:
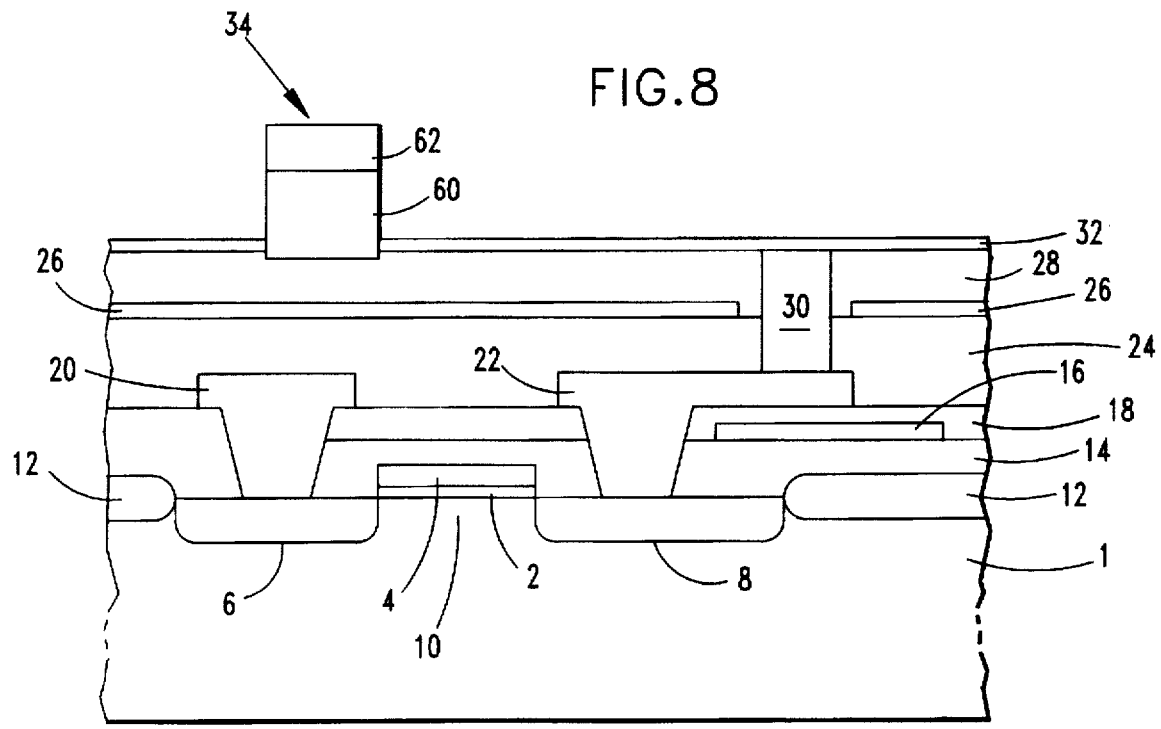
FIG. 8 shows the method of fabricating a liquid crystal display device according to the embodiment of this invention.

The mask 66 is used to etch the silicon oxide films 60, 62 by reactive ion etching (RIE) in order to complete pillar-shape spacers 34 (FIG. 8). The pillar-shape spacer 34 is located between the light reflecting films 32 and formed so as to have a width almost equal to the distance between the light reflecting films 32.

Thereafter, this substrate is stuck to a glass protect substrate 40 on which an opposing electrode 38 formed by a conventional process and liquid crystal is then sealed in the cell gaps to complete a reflection liquid crystal light bulb.

As described above, since the manufacture according to this embodiment uses during the photolithographic process for forming spacers, the self-alignment process employing the difference in the contrast within the substrate the pillar-shade spacer 34 can be located between the light reflecting films 32, and formed so as to have a width almost equal to the distance between the light reflecting films 32.

Although in the above embodiment, the spacer 34 of a specified length has been formed in the region between the light reflecting films 32, desired spacers 34 can be formed in arbitrary regions by using a mask 68 shown at B and C in FIG. 9, as other embodiments.

B in FIG. 9 shows the case in which the mask 66 is formed in the intersection formed by the light reflecting films 32 arranged in both the row and column directions. The photoresist film 64 remaining on all the regions between the light reflecting films 32 on the substrate 1 is over-exposed and over-developed using, for example, the square resist patterning mask 68 shown at B in FIG. 9 in order to pattern the photoresist film 64 between the light reflecting films 32, thereby forming a square mask 66 in the intersection.

C in FIG. 9 is formed over the intersection formed by the light reflecting films arranged in both the row and column directions by carrying out patterning under exposure conditions similar to those for A in FIG. 9 using the square resist patterning mask 68 shown at C so as to form a mask 66 with a cross bottom.

The spacer 34 formed using B and C in FIG. 9 has a large area and volume, and thus has an improved weight resistance. The spacer formed using this mask 66 is shown in FIG. 2. In this figure, the spacers 70, 72, and 74 are formed using the mask 66 at A in FIG. 9, the mask 66 at B, and the mask 66 at C, respectively.

Although in the above embodiment, the photoresist film 64 has been patterned using the two steps: the self-aligned patterning step and the patterning with the resist patterning mask, the positions between the light reflecting films 32 in which the pillar-shape spacers 34 are to be formed may be over-exposed during exposure after the photoresist film 64 has been formed, by simultaneously using the resist patterning masks 68 shown in FIG. 9 to obtain an exposure of 160% relative to the normal 1:1 exposure in order to prevent the spacer from resting on the light reflecting film 32, and over-developed at a ratio of 400% relative to the development time (TOP) required to remove the exposed resist down to its bottom. This has an advantage that the number of required photolithographic steps can be reduced.

As described above, this invention enables pillar-shape spacers to be formed only on the regions between the plurality of light reflecting films, thereby increasing the numerical aperture of the subpixels of the reflection liquid crystal light bulb.

We claim:

1. A liquid crystal display device having a plurality of light reflecting films that reflect incident light and also function as a display electrode, an opposing electrode installed opposite to said reflecting films on the incidence side thereof, a liquid crystal layer sealed between said light reflecting films and said opposing electrode, pillar-shaped spacers formed in said liquid crystal layer so as to maintain specified cell gaps, and an optical absorbing layer formed at least between said plurality of light reflecting films below them, characterized in that:

said spacers are formed on the regions between said light reflecting films and not directly on said light reflecting films; and said optical absorbing layer is formed by laminating Ti about 100 Å in thickness, Al about 1.000 Å in thickness, and TiN about 500 Å in thickness in this order.

2. A method of fabricating a liquid crystal display device characterized by the steps of:

forming a light absorbing layer on a semiconductor substrate;

forming a first insulating film covering the light absorbing layer;

forming on said first insulating film a plurality of light reflecting films;

forming a second insulating film covering the light reflecting films;

coating positive photoresist all over said second insulating film to form a resist layer;

exposing said resist layer from above with flood light illumination to expose portions of said resist layer overlying said light reflecting films to both direct and reflected light while exposing portions of said resist layer not overlying said light reflecting films substantially to only direct light;

developing said exposed resist layer to form a self-aligned mask in which said resist layer remains only on the regions between said plurality of light reflecting films; and using said mask to etch said third insulating film to form pillar-shaped spacers on the regions between said plurality of light reflecting films.

3. A method of fabricating a liquid crystal display device according to claim 2 characterized in that:

when said resist layer is exposed, the positions in which said spacers are to be formed are masked before exposure.

4. A method of fabricating a liquid crystal display device according to claim 2 and further comprising the steps of:

sticking said substrate to an opposing substrate on which an opposing electrode supported by said spacers is formed; and sealing liquid crystal in the cell gaps formed by said spacers.

5. A method of fabricating a liquid crystal display device characterized by the steps of:

forming a plurality of switching elements on a semiconductor substrate;

forming a first insulating film covering the switching elements;

forming a light absorbing layer on said first insulating film;

forming a second insulating film covering the light absorbing layer;

forming a plurality of studs insulated electrically from said light absorbing layer and connected electrically to said plurality of switching elements, respectively;

forming on said second insulating film a plurality of conductive light reflecting films connected electrically to said studs and corresponding to said plurality of switching elements, respectively;

forming a third insulating film covering the conductive light reflecting films;

coating positive photoresist all over said third insulating film to form a resist layer;

exposing and developing said resist layer from above to form a mask in such a way that said resist layer remains only on the regions between said plurality of light reflecting films in a self-aligned manner;

using said mask to etch said third insulating film to form pillar-shaped spacers on the regions between said plurality of light reflecting films;

sticking this substrate to an opposing substrate on which an opposing electrode supported by said spacers is formed; and sealing liquid crystal in the cell gaps formed by said spacers.

6. A method of fabricating a liquid crystal display device according to claim 2 or 5 characterized in that:

said light absorbing layer is formed by laminating Ti about 100 Å in thickness, Al about 1,000 Å in thickness, and TiN about 500 Å in thickness in this order.

* * * * *